(12) United States Patent
Curry

(10) Patent No.: US 7,828,500 B2
(45) Date of Patent: Nov. 9, 2010

(54) THREADED ENGAGEMENT ELEMENT WITH SELF-LOCKING THREADS

(75) Inventor: Brett Curry, Monson, MA (US)

(73) Assignee: Smith & Wesson Corp., Springfield, MA (US)

( * ) Notice: Subject to any disclaimer, the term of this patent is extended or adjusted under 35 U.S.C. 154(b) by 271 days.

(21) Appl. No.: 11/612,621

(22) Filed: Dec. 19, 2006

(65) Prior Publication Data

US 2008/0145178 A1   Jun. 19, 2008

(51) Int. Cl.
*F16B 35/04* (2006.01)
(52) U.S. Cl. ........................ 411/308; 411/413
(58) Field of Classification Search ............... 411/308, 411/413
See application file for complete search history.

(56) References Cited

U.S. PATENT DOCUMENTS

| 2,383,231 | A | * | 8/1945 | Anderton | ............ 411/308 |
|---|---|---|---|---|---|
| 2,419,555 | A | * | 4/1947 | Fator | ............ 411/387.3 |
| 2,587,544 | A | * | 2/1952 | Sneddon | ............ 285/333 |
| 3,133,578 | A | * | 5/1964 | Moskovitz | ............ 411/309 |
| 3,227,199 | A | * | 1/1966 | Mount | ............ 411/307 |
| 3,454,070 | A | * | 7/1969 | Phipard, Jr. | ............ 411/168 |
| 3,643,543 | A | * | 2/1972 | Gutshall | ............ 411/418 |
| 3,799,229 | A | * | 3/1974 | Johnson | ............ 411/307 |
| 3,861,269 | A | * | 1/1975 | Laverty | ............ 411/413 |
| 4,351,626 | A | * | 9/1982 | Holmes | ............ 411/311 |
| 4,582,348 | A | * | 4/1986 | Dearden et al. | ............ 285/148.19 |
| 6,332,741 | B1 | * | 12/2001 | Janusz | ............ 411/412 |
| 2005/0079029 | A1 | * | 4/2005 | Braeuer et al. | ............ 411/308 |

* cited by examiner

*Primary Examiner*—Gary Estremsky
(74) *Attorney, Agent, or Firm*—McCormick, Paulding & Huber LLP

(57) ABSTRACT

A threaded engagement element comprising a body having a longitudinal axis and a thread adapted to be received by a corresponding thread of a second element. The threads are characterized by a thread parameter. The body has first and second portions that each has a different value for the thread parameter. The body may have more than one thread count or more than one geometry. This configuration creates a threaded engagement element with self-locking threads, which prevents unintentional loosening.

4 Claims, 1 Drawing Sheet

THREADED ENGAGEMENT ELEMENT WITH SELF-LOCKING THREADS

FIELD OF THE INVENTION

The present invention relates to cooperative threaded engagement elements with self-locking threads. More particularly, it relates to a pair of threaded engagement elements, one of which has a portion with differing thread parameters, which prevents one element of the pair from loosening relative to the other after tightening.

BACKGROUND OF THE INVENTION

Bolted joints are used to affix two or more parts together and typically have two engaging elements (a bolt and nut or equivalent structure) that are characterized by cooperative threads. The threads are most often spiral and have a given pitch and thread count. Relative longitudinal movement between the nut and bolt along a common axis is produced when one or the other element is rotated. At some longitudinal position, the two elements engage the parts that are to be fastened, and fix the same in place when sufficient torque is applied to one element relative to the other. The parts remain fixed due to the frictional force that is generated at the interfaces between threads, the parts and the surfaces of the engaging elements (nut and bolt) that contact the parts. This type of fastened joint suffers from the problem of unintentional loosening due to operational conditions. Tightened bolts or nuts rotate loose when relative motion between the cooperating threads occurs.

Several factors can cause this relative motion. First, parts can bend which results in forces being induced at the friction surface. Second, changes in temperature can cause the bolt and nut to alternatively constrict and expand, causing slight relative movement that reduces those frictional forces. Finally, applied forces on the joint components can lead to shifting of the joint surfaces.

Many attempts have been made to prevent a bolt from being loosened unintentionally. Some attempts involve the increase of friction between the male and female threads. Other attempts try to increase the frictional force between the bottom of the bolt head and the work piece by the use of extra components such as washers interposed between an engaging element and the part that it contacts. These can be split, star or spring washers. Others have added a chemical adhesive to the threads to bond the nut to the bolt at the threads.

However, these attempts have several disadvantages. First, these attempts still suffer from relative loosening when different forces are applied. Second, an increase in friction often takes more torque to install than a standard nut and bolt. Third, the extra parts or chemicals significantly increase assembly cost and time. The present invention overcomes these disadvantages by providing a bolt that is as easy to install as a standard assembly but does not suffer from loosening over time.

SUMMARY OF THE INVENTION

An object of the present invention is to provide a threaded element with threads that self-lock when engaged with a cooperatively configured second threaded element.

Another object of the present invention is to prevent relative loosening between cooperative threads of first and second fastening elements.

Still another object of the present invention is to shorten the cost and assembly time of a bolted joint.

According to one aspect of the present invention, a threaded engagement element includes a body having a longitudinal axis and a thread adapted to be received by a corresponding thread of a second element. The threads are characterized by a thread parameter. The element body has first and second portions each with a different value of the thread parameter.

According to another aspect of the present invention, a cooperative element pair for use in affixing a first part to a second part includes a first element having a longitudinal axis and a thread formed on a surface thereof. A second element has a thread formed in a surface thereof. The thread of the second element is adapted to be received by the first element thread. Each of the first and second element threads are characterized by a thread parameter. The first element further has first and second portions, each with a different value of the thread parameter.

According to still another aspect of the present invention, a bolt includes a generally cylindrical body having a longitudinal axis and an external thread. The bolt also has a head continuous with the body. In addition, the thread on the body may have more than one thread geometry. Preferably, the thread geometry may be steeper as it becomes closer to the head of the bolt. More preferably, the thread geometry may be steeper for the last four threads closest to the head of the bolt.

The body may also have more than one thread count. Preferably, the thread count may be higher closer to the head of the bolt. More preferably, the thread count may be higher for the last four threads closest to the head of the bolt.

DETAILED DESCRIPTION OF THE PREFERRED EMBODIMENT

Figure 1:
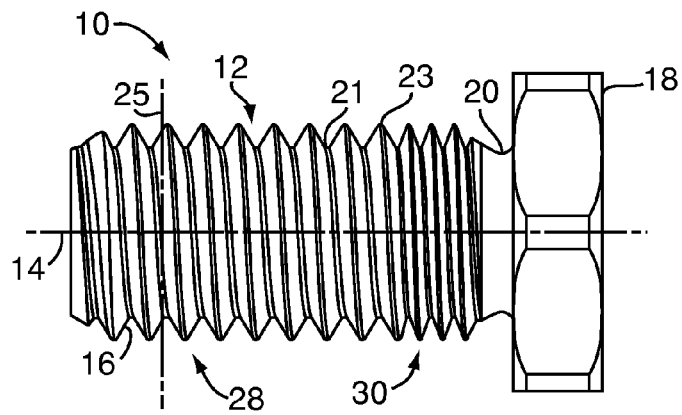
FIG. 1 is a simplified schematic side view of a bolt with self-locking threads provided in accordance with the present invention.
Figure 2:
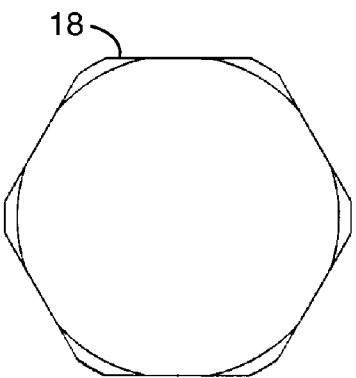
FIG. 2 is a simplified schematic end view of the bolt of FIG. 1.
Figure 3:
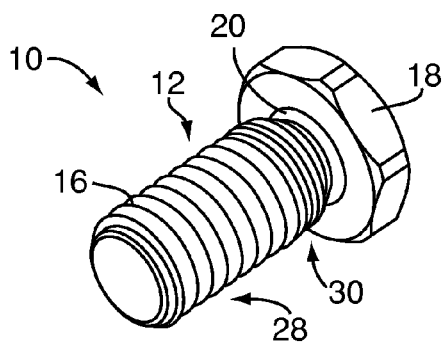
FIG. 3 is a simplified schematic illustration of the bolt of FIG. 1.

The present invention is directed to fastening elements that are configured to prevent unintentional loosening. FIG. 1 shows one embodiment of the present invention in a simplified schematic form. In FIG. 1, a bolt 10 has a generally cylindrical body 12 having a longitudinal axis 14 and an external thread 16. The bolt 10 also has a head 18 continuous with the body 12. As seen in FIGS. 2 and 3, the head 18 has a series of flat peripheral surfaces configured to receive cooperative surfaces of a tool (not shown) that is used to rotate the bolt about the longitudinal axis 14. The head 18 extends radially beyond the body 12 by a pre-selected amount.

The body 12 has an external thread 16 all the way to the head 18, or the body 12 may have a shank 20 disposed between the threaded body and the head 18. The shank 20 does not have any threads in the preferred embodiment. The longitudinal dimension of the shank is important as detailed hereinafter.

The threads in both the first and second elements are characterized by certain thread parameters such as pitch, thread count, and thread geometry. "Thread geometry" includes the thread angle, which is the angle of an individual thread as measured from a thread trough 21 to an outer thread surface 23 when compared to a perpendicular 25 extending from longitudinal axis 14. Thread count is the number of threads per unit of longitudinal measure (e.g. "threads per inch"). "Pitch" is the distance from one thread to the next as measured along the length of the axis. Other thread parameters may also be configured as thread count, pitch, and thread geometry are described herein alone or in combination and are therefore contemplated by the present invention.

Figure 4:
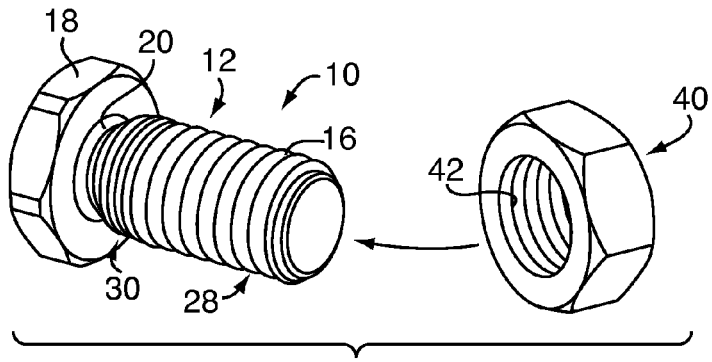
FIG. 4 is a simplified schematic illustration of a second element configured to be received by the bolt of FIG. 1.

A cooperative threaded engagement element pair includes first and second elements such as a bolt and a nut shown schematically in FIG. 4. In the prior art, these elements are characterized by uniform thread pitch and thread count allowing for smooth advancement of one element relative to the other until the parts that are to be joined are in fixed contact with one another. As noted, this arrangement often requires additional measures to preclude loosening of the joined parts by way of slight rotational movement.

With the present invention, the external thread 16 may have more than one thread geometry or more than one thread count. There are at least two regions of the threaded body. The first threaded body portion 28 has a pre-selected thread geometry and count. The second threaded body portion 30 is located adjacent the shank 20 and has a second pre-selected thread count or thread geometry, one (or both) of which is (are) different from that of the first threaded body portion.

Preferably, the thread geometry becomes steeper closer to the head 18 of the bolt 10. More preferably, the thread geometry is steeper for the last four threads closest to the shank 20 of the bolt 10. By "steeper" it is meant that the thread angle increases in magnitude. A change in thread angle of about 10 percent is preferable.

In certain applications, it is preferable for the thread count of threaded body portion 30 to become higher closer to the shank 20. More preferably, the thread count is higher for the last four threads closest to the head 18 of the bolt 10. In the embodiment of the present invention shown in FIG. 1, the thread count is increased in threaded body region 30 by about 10% as compared to that of body region 28.

In some applications it may be desirable for the threaded body portion 30 to have more than one thread count and/or more than one thread geometry, with a multitude of combinations of the same all contemplated by the present invention. The thread may have both a steeper thread angle and a higher thread count closer to the head 18 of the bolt 10. In the preferred embodiment, the thread of threaded body portion 30 has a longitudinal dimension that extends to encompass at least the last four threads closest to the head 18 of the bolt 10. Those skilled in the art will note that the longitudinal dimension of threaded body portion 30 is a function of the particular application.

Figure 5:
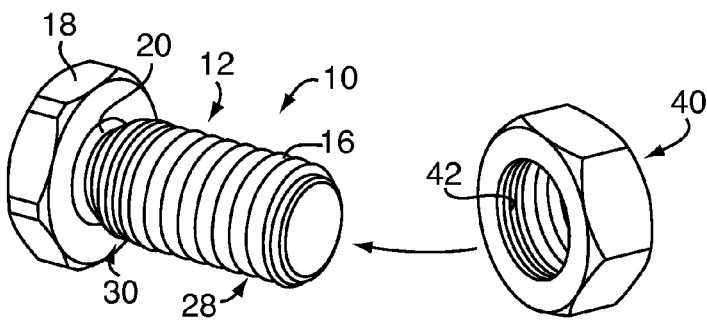
FIG. 5 is a simplified schematic illustration of a second element configured to be received by the bolt of FIG. 1, in accordance with another embodiment of the present invention.

In the preferred embodiment, the thread geometry and count of the corresponding thread 42 of the second element 40 that receives that element of the complimentary pair having threaded body portion 30 is the same as that of threaded body portion 28. However, those skilled in the art will note that the present invention contemplates embodiments, such as that shown in FIG. 5, wherein the thread geometry and thread count of the corresponding thread 42 of the second element 40 may contain a portion in which either thread geometry or count is varied as well as that in first element threaded body portion 30.

In the embodiment of FIG. 1, the bolt 10 may be used by fitting it into a threaded nut, bore, or hole, any of which comprises the second element 40 of the complimentary element pair. The bolt 10 is then twisted until the corresponding threads 42 of the nut, bore, or hole engage the differing thread geometry or thread count of the external thread 16. Preferably, the bolt 10 is twisted until the threads 42 of the nut, bore, or hole engage the external thread 16 at a point where the thread angle is steeper or the thread count is higher. More preferably, the bolt 10 is twisted until the threads 42 of the nut, bore, or hole engage the external thread 16 at the last four threads closest to the head 18 of the bolt 10, where the thread angle is steeper or the thread count is higher. As stated above, the external thread 16 of bolt 10 may have both a steeper thread angle and a higher thread count.

Those skilled in the art will note that the location of threaded body portion 30 is preferably adjacent the shank whose longitudinal dimension is a function of the particular application. In that sense, the thickness of the parts to be joined are taken into consideration so that the segment of threaded body portion 30 that is engaged with the second element 40 is sufficient to ensure the two elements remain tightly affixed to one another. Furthermore, the present invention also contemplates embodiments where the thread count or geometry of the threaded body portion 30 can decrease as compared to threaded portion 28.

Those skilled in the art will note that the cooperative threaded engagement element pair provided in accordance with the present invention is configured to be reusable in that the elements thereof can be repeatedly engaged and disengaged with the benefits of the present invention and without performance degradation. As such it is seen that the present invention overcomes the limitation of the prior art in requiring an additional component such as a split washer or a bonding agent to be applied each and every time the element pair are used to fasten parts together.

Moreover, the prior art teaches away from the present invention in that it was believed that differences in thread geometry and/or thread count between threaded fastening elements was to be avoided as the threads were inevitably damaged when engaged, thereby precluding proper fastening torque and subsequent reuse. However, the present invention overcomes these drawbacks.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A cooperative element pair for use in affixing a first part to a second part, said element pair comprising:

a first element of a generally cylindrical shape having a first portion and a second portion and having a longitudinal axis and a single thread formed on a surface thereof; and a second element having a thread preformed on a surface thereof and adapted to receive said single thread of said first element, each of said first and second element threads characterized by a thread parameter including at least a thread count or pitch;

wherein said first portion and said second portion of said first element each has a different thread count or pitch;

wherein said first and second portions have a substantially equal thread height so that said single thread of said first element may be received by said thread of said second element without damage being caused to either of said first and second element threads so that said first and said second element may be reused without performance degradation; and wherein said second element further comprises first and second portions, each with a different value of said thread parameter.

2. The cooperative element pair of claim 1 wherein said thread parameter value of said second element second portion is selected to resist disengagement of said second element from said first element when said first and second parts are affixed to one another.

3. A cooperative element pair for use in affixing a first part to a second part, said element pair comprising:
  a first element having a generally cylindrical body and a head continuous with said cylindrical body, said cylindrical body having a first portion adjacent said head and a second portion adjacent said first portion and opposite said head and having a longitudinal axis and a thread formed on a surface thereof; and
  a second element having a thread preformed on a surface thereof and adapted to receive said first portion of said first element subsequent to receiving said second portion of said first element, each of said first and second element threads characterized by a thread angle;

wherein at least a portion of said first portion has a steeper thread angle than said second portion;

wherein said first and second portions have a substantially equal thread height so that said thread of said first element may be received by said thread of said second element without damage being caused to either of said first and second element threads so that said first and said second element may be reused without performance degradation; and wherein said second element further comprises first and second portions, each with a different value of said thread angle.

4. The cooperative element pair of claim 3 wherein said thread angle value of said second element second portion is selected to resist disengagement of said second element from said first element when said first and second parts are affixed to one another.

* * * * *